(12) United States Patent
Zhang et al.

(10) Patent No.: US 7,864,364 B2
(45) Date of Patent: Jan. 4, 2011

(54) COLOR CORRECTION OF IMAGES

(75) Inventors: Yeqing Zhang, Penfield, NY (US);
Robert P. Loce, Webster, NY (US);
Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1236 days.

(21) Appl. No.: 11/199,692

(22) Filed: Aug. 9, 2005

(65) Prior Publication Data
US 2007/0035748 A1 Feb. 15, 2007

(51) Int. Cl.
*G03F 3/08* (2006.01)
*G06F 15/00* (2006.01)

(52) U.S. Cl. .................. 358/1.9; 358/518; 358/515; 358/248; 358/3.03; 358/534; 358/448; 358/521; 358/465; 382/248; 382/162; 382/163; 382/164; 382/165; 382/166; 382/167

(58) Field of Classification Search .......... 358/1.9, 358/518, 515, 535, 3.03, 534, 448, 521, 465; 382/248, 162–167
See application file for complete search history.

(56) References Cited

U.S. PATENT DOCUMENTS

| | | | | |
|---|---|---|---|---|
| 5,309,246 | A * | 5/1994 | Barry et al. .................. 358/1.9 |
| 5,604,610 | A * | 2/1997 | Spaulding et al. .......... 358/525 |
| 5,749,020 | A | 5/1998 | Mestha et al. |
| 5,946,521 | A * | 8/1999 | Budnik et al. ................. 399/24 |
| 6,091,849 | A * | 7/2000 | Spaulding et al. ........... 382/162 |
| 6,721,063 | B1 * | 4/2004 | Harrington .................. 358/1.9 |
| 6,760,056 | B2 | 7/2004 | Klassen et al. |
| 2002/0075379 | A1 | 6/2002 | Klassen et al. |
| 2003/0048478 | A1 | 3/2003 | Cheng et al. |
| 2004/0136015 | A1 | 7/2004 | Van de Capelle et al. |
| 2004/0165199 | A1 | 8/2004 | Klassen et al. |
| 2004/0179090 | A1 | 9/2004 | Klassen et al. |
| 2004/0233463 | A1 * | 11/2004 | Hersch et al. ................ 358/1.9 |
| 2004/0257619 | A1 | 12/2004 | Loce et al. |
| 2005/0134624 | A1 | 6/2005 | Mizes |
| 2005/0195437 | A1 | 9/2005 | Couwenhoven et al. |
| 2006/0171602 | A1 * | 8/2006 | Ernst et al. .................. 382/248 |
| 2006/0245001 | A1 | 11/2006 | Lee et al. |

OTHER PUBLICATIONS

U.S. Appl. No. 10/922,316, filed Aug. 19, 2004, Zhang, et al.
U.S. Appl. No. 10/923,166, filed Aug. 20, 2004, Zhang, et al.
U.S. Appl. No. 10/999,326, filed Nov. 30, 2004, Grace, et al.
U.S. Appl. No. 11/070,681, filed Mar. 2, 2005, Viturro, et al.
U.S. Appl. No. 11/143,818, filed Jun. 2, 2005, Dalal, et al.

* cited by examiner

*Primary Examiner*—King Y Poon
*Assistant Examiner*—Quang N Vo
(74) *Attorney, Agent, or Firm*—Fay Sharpe LLP

(57) ABSTRACT

A color transformation method which accounts for colorant interactions includes establishing a plurality of tone reproduction curves (TRCs), for one or more of the color separations forming a digital image. Each TRC accounts for colorant interactions between a primary colorant with which the first color separation is to be rendered and at least one secondary colorant with which at least a second of the plurality of color separations is to be rendered. The TRCs include input values and their corresponding modified input values. In a given TRC, the input values of the second and optionally other color separations are fixed. For a pixel of the digital image having a given input values for the first and second color separation one or more of the TRCs are selected which bound the fixed input value for the second color separation and a modified input value is determined therefrom.

27 Claims, 7 Drawing Sheets

$C_{mod}$

| $C_{in}$ | m=0, y=0 | m=160, y=0 | m=224, y=0 | m=255, y=0 | m=0, y=160 | m=160, y=160 | m=224, y=160 | m=255, y=160 | m=0, y=224 | m=160, y=224 | m=224, y=224 | m=255, y=224 | m=0, y=255 | m=160, y=255 | m=224, y=255 | m=255, y=255 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 32 | 36 | 34 | 33 | 33 | 34 | 32 | 33 | 32 | 33 | 33 | 33 | 32 | 33 | 32 | 32 | 32 |
| 64 | 72 | 68 | 66 | 66 | 67 | 66 | 67 | 66 | 66 | 67 | 67 | 66 | 66 | 66 | 66 | 65 |
| 96 | 104 | 98 | 97 | 96 | 99 | 97 | 98 | 97 | 97 | 98 | 98 | 97 | 97 | 98 | 96 | 95 |
| 128 | 132 | 129 | 128 | 125 | 129 | 127 | 128 | 127 | 127 | 128 | 128 | 126 | 121 | 127 | 126 | 125 |
| 160 | 165 | 160 | 158 | 155 | 159 | 159 | 158 | 156 | 156 | 158 | 158 | 156 | 150 | 158 | 155 | 153 |
| 192 | 201 | 192 | 192 | 181 | 191 | 194 | 191 | 190 | 191 | 191 | 194 | 190 | 184 | 190 | 189 | 188 |
| 224 | 232 | 226 | 225 | 211 | 223 | 229 | 226 | 223 | 224 | 225 | 228 | 223 | 217 | 223 | 222 | 222 |
| 255 | 255 | 255 | 255 | 255 | 255 | 255 | 255 | 255 | 255 | 255 | 254 | 254 | 255 | 255 | 254 |

$M_{mod}$

| $M_{in}$ | c=0, y=0 | c=160, y=0 | c=224, y=0 | c=255, y=0 | c=0, y=160 | c=160, y=160 | c=224, y=160 | c=255, y=160 | c=0, y=224 | c=160, y=224 | c=224, y=224 | c=255, y=224 | c=0, y=255 | c=160, y=255 | c=224, y=255 | c=255, y=255 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 34 | 34 | 33 | 33 | 32 | 33 | 33 | 32 | 31 | 33 | 34 | 34 | 31 | 33 | 34 | 34 |
| 68 | 68 | 68 | 67 | 64 | 66 | 67 | 67 | 64 | 66 | 67 | 67 | 64 | 66 | 67 | 66 |
| 101 | 101 | 100 | 101 | 95 | 99 | 100 | 100 | 97 | 99 | 100 | 100 | 95 | 97 | 98 | 99 |
| 133 | 133 | 134 | 134 | 127 | 132 | 133 | 133 | 129 | 132 | 133 | 132 | 126 | 130 | 132 | 132 |
| 167 | 169 | 169 | 168 | 159 | 167 | 169 | 167 | 160 | 166 | 168 | 166 | 158 | 167 | 167 | 166 |
| 197 | 199 | 200 | 199 | 192 | 199 | 198 | 198 | 191 | 198 | 200 | 198 | 190 | 195 | 197 | 197 |
| 229 | 233 | 234 | 233 | 228 | 236 | 234 | 231 | 223 | 233 | 236 | 232 | 222 | 228 | 231 | 231 |
| 255 | 255 | 255 | 255 | 255 | 255 | 255 | 255 | 255 | 255 | 255 | 255 | 255 | 255 | 255 | 255 |

$Y_{mod}$

| $Y_{in}$ | c=0, m=0 | c=160, m=0 | c=224, m=0 | c=255, m=0 | c=0, m=160 | c=160, m=160 | c=224, m=160 | c=255, m=160 | c=0, m=224 | c=160, m=224 | c=224, m=224 | c=255, m=224 | c=0, m=255 | c=160, m=255 | c=224, m=255 | c=255, m=255 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 33 | 33 | 33 | 33 | 33 | 32 | 33 | 33 | 34 | 32 | 33 | 34 | 36 | 36 | 31 | 31 |
| 67 | 66 | 66 | 67 | 66 | 65 | 66 | 66 | 67 | 66 | 66 | 66 | 68 | 67 | 66 | 66 |
| 100 | 99 | 99 | 100 | 99 | 98 | 100 | 99 | 100 | 100 | 99 | 99 | 101 | 101 | 98 | 99 |
| 132 | 133 | 133 | 133 | 133 | 132 | 133 | 132 | 134 | 135 | 133 | 132 | 135 | 132 | 131 | 131 |
| 165 | 169 | 168 | 169 | 172 | 171 | 170 | 167 | 171 | 172 | 168 | 166 | 172 | 174 | 168 | 167 |
| 194 | 201 | 200 | 200 | 204 | 202 | 200 | 197 | 201 | 200 | 199 | 196 | 200 | 200 | 196 | 195 |
| 226 | 231 | 232 | 231 | 236 | 238 | 235 | 231 | 238 | 236 | 236 | 229 | 234 | 225 | 221 | 222 |
| 255 | 254 | 255 | 255 | 255 | 255 | 255 | 255 | 255 | 255 | 255 | 255 | 255 | 255 | 250 | 251 |

FIG. 2

COLOR CORRECTION OF IMAGES

CROSS REFERENCE TO RELATED APPLICATIONS

The following applications, the disclosures of which are totally incorporated herein by reference, are mentioned:

U.S. patent application Ser. No. 10/922,316, entitled METHOD AND SYSTEMS ACHIEVING PRINT UNIFORMITY USING REDUCED MEMORY OR COMPUTATIONAL REQUIREMENTS, filed Aug. 19, 2004, by Zhang, et al.;

U.S. application Ser. No. 11/143,818 entitled INTER-SEPARATION DECORRELATOR, filed Jun. 2, 2005, by Dalai, et al.;

U.S. application Ser. No. 10/923,166, entitled UNIFORMITY COMPENSATION IN HALFTONED IMAGES, filed Aug. 20, 2004, by Zhang, et al.;

U.S. application Ser. No. 10/999,326, filed Nov. 30, 2004, entitled SEMI-AUTOMATIC IMAGE QUALITY ADJUSTMENT FOR MULTIPLE MARKING ENGINE SYSTEMS, by Robert E. Grace, et al.; and U.S. application Ser. No. 11/070,681, filed Mar. 2, 2005, entitled GRAY BALANCE FOR A PRINTING SYSTEM OF MULTIPLE MARKING ENGINES, by R. Enrique Viturro, et al.;

U.S. application Ser. No. 11/200,227, filed Aug. 9, 2005, entitled COLOR COMPENSATION OF IMAGES, by Zhang, et al.

BACKGROUND

The present exemplary embodiment relates to the field of digital imaging. It finds particular application in connection with the correction of colorant input values for the effects of other colorants present in an image rendering device, such as a printer. However, methods and systems disclosed herein are applicable to other rendering technologies, such as, for example, color image displays.

Image non-uniformity occurs in the output images of digital imaging devices, such as copiers, scanners, and printers, for a variety of reasons. Even relatively small non-uniformities can give rise to visibly objectionable print defects. In printing systems, physical alignments, component tolerances, wear and component age can influence the uniformity with which colorants, such as inks and toners, are laid down across the surface of print media. Streaks, for example, are one-dimensional image defects that generally run parallel to the process direction in the printed image. They can arise from non-uniform responses of the subsystems of a marking engine and can be constant over time in that they appear in relatively the same location from print to print. Photoreceptor scratches, contamination of the charger wire, non-uniform LED imager output and Raster Output Scanner (ROS) spot size variations, and spatially varying pressure on a bias transfer roll are examples of subsystem defects which can give rise to rendered image streaking in a xerographic marking engine. Bands are also one-dimensional image defects that generally run perpendicular to the process direction in a printed image. They are typically caused by time-varying performance of a marking engine subsystem, such as non-uniform velocity of the photoreceptor drive, out-of-roundness of development rolls, and wobble of the ROS polygon mirror. In a uniform patch of gray, streaks and bands may appear as a variation in the gray level. In general, "gray" refers to the optical density or area coverage value of any single color separation layer, whether the toner is black, cyan, magenta, yellow, or some other color. Other printing technologies (e.g., thermal inkjet and acoustic ink printing) also have artifacts that occur in a regular, predictable manner, in one or both of the marking engine process direction and cross-process direction, and fall within the scope of this discussion.

Imaging devices generally include a processing component which converts color input values for an image into corresponding output values for each of the colorants to be used in rendering the image. For color images, bitmaps, each forming a color separation, are combined. Each color separation may be defined by a number of gray levels. The multiple color separations are combined together at printing to yield the final color print. Commonly, color documents are formed using cyan, magenta, and yellow colorants or cyan, magenta, yellow, and black colorants. A larger number or alternative colorants may also be used.

One-dimensional Tone Reproduction Curves (TRCs) are widely used in digital imaging as a means for compensating for non-linearities introduced by an individual imaging device. In general, the same TRC is used for each pixel in an image. Conventionally, one TRC is used for each of the colorants, i.e., four TRCs in the case of a CMYK process color marking device, a single TRC for a monochrome (single color) device. The TRCs can be periodically refined by printing calibration patches on the imaging device, comparing the measured color of each of the calibration patches with that of respective reference colors, and modifying the TRCs to achieve a closer correlation between the printed calibration patches and reference colors.

Some success has been achieved in the spatial uniformity correction of monochrome images for banding and streaking by appropriate modification to the tone reproduction curve. In the case of streaking, for example, the TRC is modified as a function of position in the cross-process direction. Several TRCs may be developed, and the appropriate TRC selected, depending on a pixel's address. For example, a light streak gives lower print densities as a function of input gray level when printing over the streak than when printing away from the streak and may thus be compensated for by increasing the gray level in the region of the streak.

In color imaging, the correction of spatial non-uniformities, such as streaks has proved more challenging. Colorant-specific, spatially dependent compensating functions can provide substantial improvements in image quality and image consistency. However, the effects of spatial non-uniformities have been found to vary depending on interactions among the colorants. In offset printing, for example, the efficiency with which an ink is absorbed or trapped can be influenced by the presence of another ink laid down earlier and on spatial variations in transfer roll pressures. Related colorant appearance variations associated with print-head-to-print-media spacing variations associated with ink jet technology are also anticipated. In electrophotographic processes, toner pile heights, which generally increase with the number of colorants, may be one source of colorant interaction non-uniformities. Spatially varying (inboard/outboard) pressure on a bias transfer roll may be another source. Thus, TRCs which consider each of the color separations individually do not always adequately address the effects of interactions between two or more colorants.

Printers, copiers and various forms of printing systems have been developed which include two or more marking engines. These systems enable high overall throughput to be achieved by either printing portions of the same document on multiple marking engines or printing the entire document in parallel on multiple marking engines. Such systems are commonly referred to as "tandem engine" printers, "parallel"

printers, or "cluster printing" systems which may print color and monochrome pages on different marking engines. However, spatial non-uniformities may be more apparent in documents produced by two or more marking engines.

REFERENCES

U.S. Pat. No. 6,760,056 to Klassen, et al., entitled MACRO UNIFORMITY CORRECTION FOR X-Y SEPARABLE NON-UNIFORMITY, the disclosure of which is incorporated herein in its entirety, by reference, discloses a method for compensating for streaks by introducing a separate tone reproduction curve for each pixel column in the process direction. A compensation pattern is printed and then scanned to first measure the ideal tone reproduction curve and then detect and measure streaks. The tone reproduction curves for the pixel columns associated with the streak are then modified to compensate for the streak.

BRIEF DESCRIPTION

Aspects of the exemplary embodiment relate to a color transformation method and system, and to an image rendering device which includes the system. In one aspect, the color transformation method includes, for a first of a plurality of color separations in a digital image, a) establishing a plurality of tone reproduction curves, each of the tone reproduction curves accounting for colorant interactions between a primary colorant with which the first color separation is to be rendered and at least one secondary colorant with which at least a second of the plurality of color separations is to be rendered, each of the tone reproduction curves including modified input values corresponding to input values for the color separation at fixed input values of at least the second color separation, b) for a pixel of the digital image having a given input value for the first color separation and a given input value for at least the second color separation, selecting, from the plurality of tone reproduction curves, at least one tone reproduction curve for which the fixed input value for the second color separation is close to the given input value for the second color separation, c) for each of the selected tone reproduction curves, determining a modified input value for the first color separation which corresponds to the input value for the first color separation, and d) where more than one tone reproduction curve is selected, determining a combined modified input value for the color separation of the pixel as a function of the modified input values for the first color separation determined from the selected reproduction curves.

In another aspect, a color transformation system includes memory which stores, for each of a plurality of color separations, a plurality of tone reproduction curves. Each of the tone reproduction curves accounts for colorant interactions between a primary colorant with which the color separation is to be rendered and at least one secondary colorant with which at least a second of the plurality of color separations is to be rendered. Each of the tone reproduction curves including modified input values corresponding to input values for the color separation at fixed input values of at least the second color separation. The system further includes a processing component which, for a pixel of a digital image, accesses the memory and identifies a subset of tone reproduction curves from the plurality of tone reproduction curves for which the fixed input values of at least the second color separation bound the input values of the secondary color separation for the pixel, determines, from each the subset of tone reproduction curves, a modified input value for the color separation which corresponds to an input value for the color separation, and determines a combined modified input value for the color separation of the pixel as a function of the modified input values for the color separation determined from the selected tone reproduction curves.

In another aspect, a color transformation method includes, for each of a plurality of color separations for rendering an image, a) for each of a plurality of regions of the image, establishing a plurality of tone reproduction curves, each of the tone reproduction curves accounting for interactions between a colorant with which the color separation is to be rendered and at least one secondary colorant with which a second of the plurality of color separations is to be rendered, each of the tone reproduction curves including modified input values corresponding to input values for the color separation at fixed input values of the at least one other color separation, b) for a pixel of interest in the image which is located in a first of the regions, the pixel having a given input value for the color separation and a given input value for the at least second color separation, identifying, from the plurality of tone reproduction curves for the first region, a plurality of bounding tone reproduction curves for which the fixed input values for the at least one other color separation bound the given input value of the at least second color separation, c) from each of the bounding tone reproduction curves, determining a modified input value which corresponds to the input value for the color separation, and d) determining a combined modified input value for the color separation of the pixel of interest as a function of the modified input values determined from the bounding tone reproduction curves.

In another aspect a color imaging method includes, for each of a plurality of pixels of interest in a digital image, a) transforming an input value of a first color separation in the digital image to account for an interaction between a first colorant associated with the first color separation and at least a second colorant associated with at least a second color separation in the digital image, the transformation yielding a modified input value for the first color separation, and b) transforming an input value of the second color separation in the digital image to account for an interaction between the second colorant and at least the first colorant, the transformation yielding a modified input value for the second color separation. The method further includes forming an image with at least the first and second colorants utilizing the modified input values for the first color separation and the second color separation.

BRIEF DESCRIPTION OF THE DRAWINGS

FIG. 2 shows exemplary colorant-specific tone reproduction curves according to a first aspect of the exemplary embodiment;

DETAILED DESCRIPTION

Figure 1:
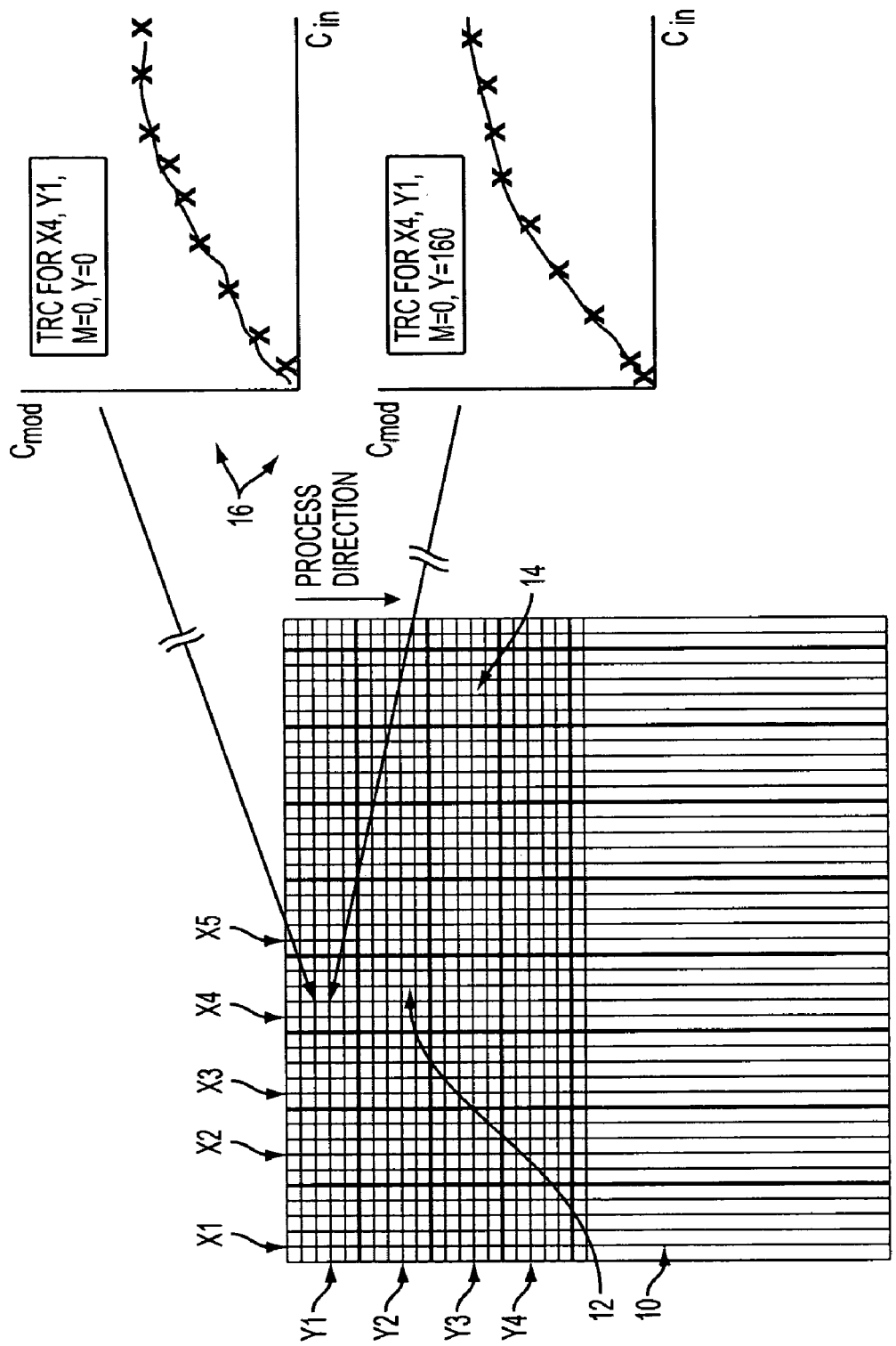
FIG. 1 is a top plan view of an image and exemplary tone reproduction curves for a region of the image.

Aspects of the exemplary embodiment relate to a method and a system for transforming input gray levels ("input values") into modified input gray levels ("modified input values") which can be used by an image rendering device in the rendering of pixels of an image. The modified input value accounts for colorant interactions between a colorant and at least one other of a plurality of colorants used in rendering the image. The input values may be the target output values of the image, as rendered by image rendering device, or may have undergone processing prior to the transforming step.

In general, "colorant" refers to the medium used for rendering a particular color separation which, in forming a multi-colored image, is combined with one or more other colorants to achieve image colors throughout the spectrum. Each color separation thus may have its own corresponding colorant. In the case of toners, colorants are typically cyan, magenta, yellow, and sometimes also black (CMYK) toners. In an inkjet printer, the colorants are inks. In the case of a display, the colorants may be red, green, and blue light. Typically, the input values and modified input values are expressed numerically, the higher the numerical value, the greater the saturation or gray level of that color separation in the resulting image. The modified input values may be used as the input values for the imaging device or further processed prior to such use. The input values for each of the color separations may reach the system in the form of a bitmap. The image rendering device uses the modified input value (either directly, or after further processing) to determine the gray level of the colorant, such as the amount of coverage of the colorant (in the case of a toner) or intensity of the colorant (in the case of a display) to be used in forming the image pixel.

Tone Reproduction Curves (TRCs) are commonly used for compensating for device non-linearities in image rendering devices, such as marking engines, that produce output levels that are not linearly proportional to the input gray levels specified. A TRC generally includes an array of cells that provide modified input gray levels for each of a set of input values corresponding to desired output gray levels of the imaging device. Some of the cells in the TRC may include measured values while others include appropriately interpolated values in between the measured values. Engine response curves describe the relationship of input gray levels to printed or displayed gray levels. TRCs that compensate for the gray level response of an engine have an inverse relationship to engine response curves. The term TRC is intended to encompass data which is stored in the form of an engine response curve.

In one aspect, a color correction method includes, for each of a plurality of color separations for rendering an image, establishing one or more tone reproduction curves (TRCs), each of the TRCs accounting for non-linear colorant interactions between the colorant associated with the color separation in question (referred to herein as the primary color separation) and at least one other of a plurality of color separations (referred to herein as the secondary color separation(s)). Each of the TRCs includes input values and corresponding modified input values for the primary color separation at one or more fixed input values for the secondary color separation(s) associated with the secondary colorant or colorants present. The TRCs may be one dimensional, with several color separation specific TRCs in a set (hereinafter color-indexed TRCs or CITRCs), each color-indexed TRC providing input and modified input values at different fixed input values of the secondary color separation(s). Or, a one-dimensional vectorized TRC (a VTRC) may include similar information to that provided in the set of color-indexed TRCs. The VTRC or selected ones of the CITRCs are accessed to determine a modified input value for the color separation which corresponds to a desired target level in the presence of specific amounts of secondary colorant(s).

Where multiple CITRCs are used, the output may be a function, such as a weighted average, of the values obtained from two or more CITRCs. The modified input value may be specific to a region of the image to provide spatially dependent colorant-specific color compensation. Depending on the location of a pixel to be corrected, the modified input value may be a function of one or more of the region-specific modified input values.

In some aspects of the exemplary embodiment, the system and method enable the correction of colorant non-uniformities over a space of desired uniformity, such as the correction of pixels of an image for device non-linearities in the process or cross-process direction. Specific aspects relate to color image streak compensation in printed material. It is to be appreciated that while particular reference is made herein to a space of desired uniformity as being a spatial dimension, e.g., on an image, such as X or Y (e.g., cross-process and process directions of an image), a space of desired uniformity can comprise a dimension in time, a device-to-device dimension, or other variable. For example a time dimension can be used to compensate for variations which are known or which can be predicted with a reasonable degree of accuracy, such as the variation over a course of a day for a given marking engine in a printing system. A device-to-device dimension can incorporate CITRCs for more than one marking engine.

In aspects of the present exemplary embodiment, the CITRCs or VTRCs are spatially dependent, such that the correction applied to each pixel depends not only on the input value for that pixel but on the row or column address of the pixel. In various aspects, the correction may be applied to all rows equally in order to correct column-to-column variation, or it may be applied to all columns equally in order to correct row-to-row variation. It may also be applied to both rows and columns in order to correct both kinds of variation. For example, where the device non-uniformities occur in a single dimension, such as the cross-process direction X, as is typically the case for streaks, VTRC for each color separation or set of CITRCs for each color separation are provided for each of a plurality of cross-process direction spatial locations. It will be appreciated that the TRCs may vary spatially in more than one dimension, such as in the X and Y dimensions, as illustrated in FIG. 1, where Y1, Y2, Y3, etc., correspond to spatial locations in the Y (process) direction and X1, X2, X3, etc. correspond to spatial locations in the X (cross-process) direction.

FIG. 1 represents a two-dimensional image 10. The image 10 may be a digital image to be rendered on a print medium such as paper, or to be displayed on a screen or otherwise, and comprises a plurality of pixels 12. Each of a plurality of regions 14 of the image 10 can be identified by X and/or Y coordinates, such as (X1, Y1), etc. In FIG. 1, the regions 14 are shown as spatially distinct, adjacent regions of equal size and comprising a plurality of pixels in both X and Y directions. It is to be appreciated, however, that the regions 14 may be of different sizes and be spaced from each other. For example, there may be N regions in the X direction and M regions in the Y direction. N can be from 1 to $N_{max}$, where $N_{max}$ is the total number of pixels in the X direction, and M can be from 1 to $M_{max}$, where $M_{max}$ is the number of pixels in the Y direction. In general, N and M can be from about 1 to 50 with at least one of N and M>1, e.g., at least one of N and M is from about 2 to about 20, e.g., at least 8. In one embodiment, suited to correction of streaks, N may be about 16, and M=1, corresponding to a region of about 1-3 cm in width. The number of regions 14 may depend on the available memory for storing corresponding TRCs and the processing speed of processing equipment used with, the TRCs. Additionally, the width of the regions may depend on the rate of change of the non-uniformity. Where the non-uniformity changes progressively and slowly across the image in X or Y directions, the regions 14 can be relatively large. For more rapidly changing non-uniformities, smaller-sized regions 14 may be appropriate. The highest frequency non-uniformities, such as narrow streaks, are often monochromatic and can be handled by other means, such as described, for example, in U.S. Pat. No. 6,760, 056 to Klassen, et al., incorporated by reference herein.

It is to be appreciated that the methods disclosed herein are also applicable to correction of color separation input values for the effects of other color separations for a region equivalent to the entire image, i.e., where N and M both=1. In such cases, non-uniformities, to the extent that they exist are not considered. Thus, while particular reference is made herein to a region 14 as being less than an area of the image 10, it is to be appreciated that the region may be the entire image.

Color-Indexed TRCs

In one aspect of the exemplary embodiment, each of the regions 14 is associated with a plurality of corresponding color-indexed TRCs 16. Specifically, each of the primary color separations is associated with a set of CITRCs 16, each CITRC corresponding to fixed amounts of the other ("secondary") color separation(s) present. In the case of C, M, Y as primary color separations, for example, there may be, for example, at least nine or at least twelve CITRCs 16 for each primary color separation, and in one embodiment sixteen or more CITRCs for each primary color separation, each of the CITRCs corresponding to a different set of fixed input values of the other two color separations. FIG. 1 shows two of the CITRCs 16 for cyan, by way of example.

The number $N_c^i$ of color-indexed TRCs for the i-th primary color separation may be expressed as:

$$N_c^i = [N_{S1}]^i \times [N_{S2}]^i \ldots \times [N_{Sz}]^i, \text{ for } i=1, 2, \ldots, z+1$$

where z is the total number of secondary color separations to be considered, and for the i-th primary color being corrected, $N_{S1}^i$ is the number of fixed levels of a first of the secondary color separations, $N_{S2}^i$ is the number of fixed levels of a second of the secondary color separations, etc., and $N_{S1}^i, N_{S2}^i$, etc. can independently be from about two to about twenty. The total number T of color-indexed TRCs for each region is thus:

$$T = N_c^1 + N_c^2 + \ldots + N_c^{(z+1)}.$$

Thus, for example, for a system employing three color separations (e.g., C, M, and Y) and four fixed levels of each secondary color separation, for each region 14, $Ns_j^i=4$, $N_c^i=16$ (for i=1, 2, 3, and j=1,2). Therefore T=[4×4]+[4×4]+[4×4]=48 color-indexed TRCs in total. The number of CITRCs for each color separation may depend, in part, on the memory storage available and on the extent to which the secondary colorants influence the CITRCs. It should be noted that where black (K) is one of the primary colorants, it has been found that, for some marking engines, it is not necessary to provide color-indexed TRCs which compensate for different amounts of black colorant. In general, the color-indexed TRCs can be provided for all or fewer than all of the color separations and associated colorants used in the marking engine. Thus, for a CMYK system, only color-indexed TRCs which compensate for the interference of C, M and Y as secondary colorants need be employed, although it is contemplated that color-indexed TRCs which take black into account may alternatively be provided.

The fixed input values for each secondary color separation can include a first value at or close to the upper end of the color separation range, a second value at or close to the lower end of the range, and at least one value intermediate the first and second values. Where color separations are expressed on an 8-bit color scale of 0-255, for example, there may be sixteen CITRCs for the primary color cyan (C) where the input values for the secondary color separations M and Y for the CITRC are fixed, as illustrated in TABLE 1 below:

TABLE 1

| Exemplary CITRCs for C |
|---|
| 1. M = 0, Y = 0 |
| 2. M = 160, Y = 0 |
| 3. M = 224, Y = 0 |
| 4. M = 255, Y = 0 |
| 5. M = 0, Y = 160 |
| 6. M = 160, Y = 160 |
| 7. M = 224, Y = 160 |
| 8. M = 255, Y = 160 |
| 9. M = 0, Y = 224 |
| 10. M = 160, Y = 224 |
| 11. M = 224, Y = 224 |
| 12. M = 255, Y = 224 |
| 13. M = 0, Y = 255 |
| 14. M = 160, Y = 255 |
| 15. M = 224, Y = 255 |
| 16. M = 255, Y = 255 |

In this embodiment, the fixed input levels of the secondary color separations include the minimum and maximum values of these color separations (0 and 255) as well as two intermediate values, although it is to be appreciated that other fixed values may be selected. Since the effect of a secondary color separation tends to be more marked at higher gray levels of the secondary color separation, more of the fixed levels may be selected to be within the upper half of the range of color values than in the lower half of the range.

Similar CITRCs are provided for each of the other primary color separations, M and Y. In the case of M, the input values of C and Y for each CITRC are fixed, and in the case of Y, the C and M input values are fixed. Each of the sixteen CITRCs for a given primary color separation includes a plurality of input values and corresponding modified input values for the color separation. The values in the CITRCs can be relatively sparse. For example, there may be at least four, and in one embodiment, at least six, and in one specific embodiment, about nine input values and corresponding modified input values in each of sixteen CITRCs for each color separation, as illustrated for the primary color separations C, M, and Y in FIG. 2. The input values are used as addresses or indices to access the modified input values that are in a look-up table or a functional form.

FIG. 1 graphically illustrates two exemplary CITRCs 16 for C for a region 14, although it is to be appreciated that in practice, the CITRC can be stored as input and modified input values or as part of a function in which weightings for a plurality of CITRCs are included, as described in greater detail below. Each CITRC can be described as "one dimensional" in the sense that it comprises coordinates in a single plane. Thus, for each input value, there is a single corresponding modified input value. When a desired input value is input into the CITRC, a corresponding modified input value (for C in the illustrated case) is generated.

It will be appreciated that there are a larger number of possible secondary color separation input values (256 in the illustrated embodiment) than there are CITRCs. Intermediate values can be obtained by interpolation, as described in greater detail below.

In one embodiment, the modified input values for cyan, magenta, and yellow for a given pixel are determined from the CITRCs 16 for the region 14 in which the pixel is located. In another embodiment, the modified input values are determined from the CITRCs of the region 14 in which the pixel is located as well as one or more of the most closely adjacent regions, e.g., up to a total of four regions, by interpolation. For example, as shown in FIG. 1, the cyan modified input value of a pixel 12 located in the lower right hand quadrant of region (X4,Y2) can be a weighted average of the $C_{mod}$ values determined from the CITRCs for regions (X4,Y2), (X4,Y3), (X5, Y2), and (X5,Y3). The weights accorded to the different $C_{mod}$ values can be inversely proportional to a distance of the pixel from the midpoint of the respective region. It will be appreciated that where the entire image 10 is a single region 14, the $C_{mod}$ value is not a function of $C_{mod}$ values determined for adjacent regions, thus no interpolation is needed at this stage.

Figure 3:
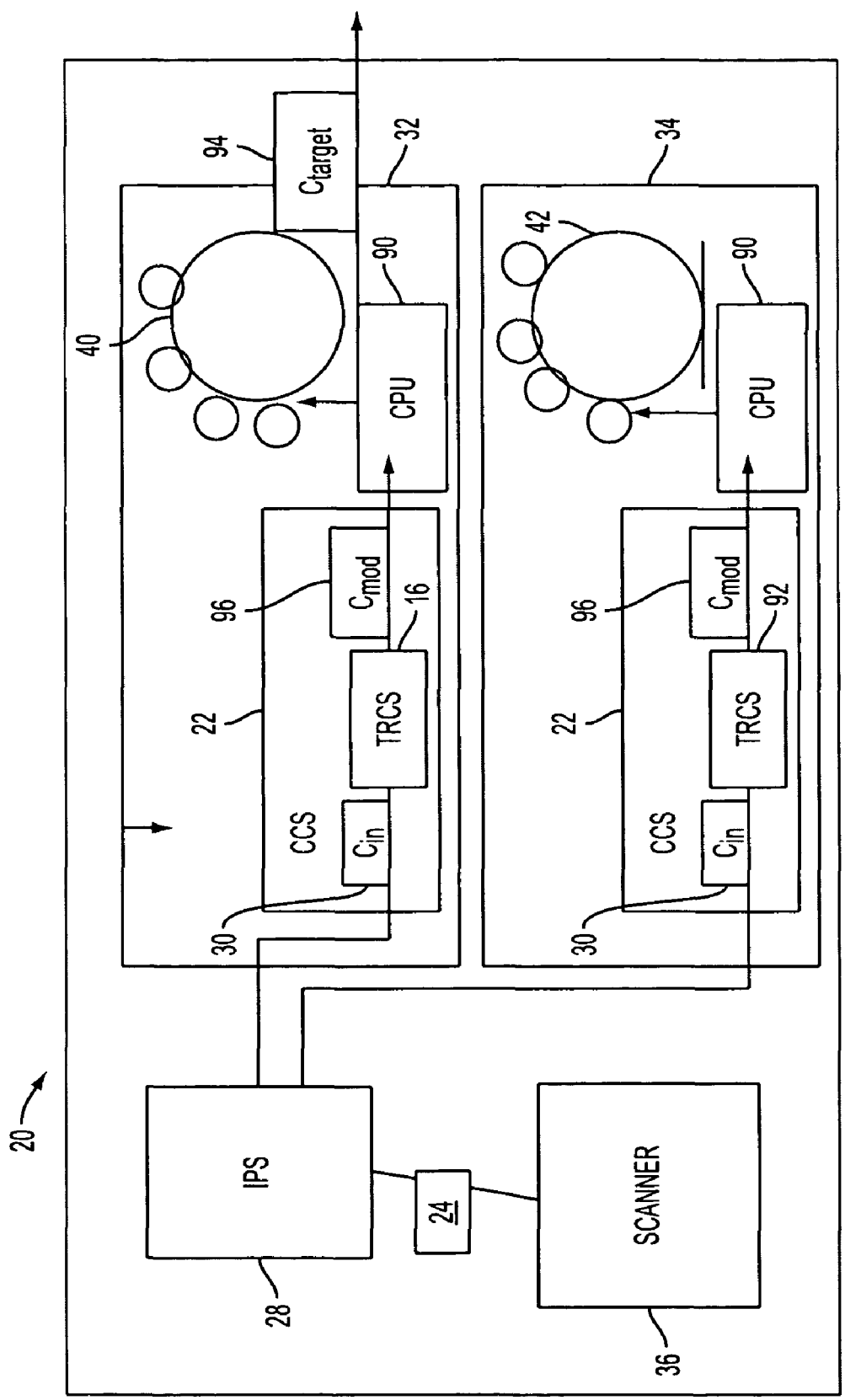
FIG. 3 is a schematic block diagram of one embodiment of a printing system according to the exemplary embodiment.

FIG. 3 illustrates an exemplary imagine rendering device in the form of a digital printing system 20 which includes at least one color correction system (CCS) 22 incorporating color-indexed TRCs 16 of the type described herein. Image data 24 representing an image to be printed is received by an image processing system (IPS) 28 that may incorporate what is known in the art as a digital front end (DFE). The image processing system 28 processes the received image data 24 to produce image data 30 in a form which can be handled by one or more output devices 32, 34 (e.g., marking engine(s)). The image data 30 is received by an appropriate marking engine 32, 34 for printing the image. The image processing system 28 may receive the image data 24 from an input terminal 36, such as scanner, which captures an image from an original document, a computer, a network, or any similar or equivalent image input terminal communicating with the image processing system 28. In some aspects, some or all of the functions of the IPS are provided by the marking engines, e.g., by the CCS 22.

In one embodiment, the system 22 includes memory which stores, for each of the plurality of color separations, a plurality of tone reproduction curves 16, each of the tone reproduction curves accounting for colorant interactions between a primary colorant with which the color separation is to be rendered and at least one secondary colorant with which at least a second of the plurality of color separations is to be rendered, each of the tone reproduction curves including modified input values corresponding to input values for the color separation at fixed input values of at least the second color separation. The system includes a processing component which, for a pixel of a digital image accesses the memory and identifies a subset of tone reproduction curves from the plurality of tone reproduction curves for which the fixed input values of at least the second color separation bound the input values of the secondary color separation for the pixel; determines, from each the subset of tone reproduction curves, a modified input value for the color separation which corresponds to an input value for the color separation; and determines a combined modified input value for the color separation of the pixel as a function of the modified input values for the color separation determined from the selected tone reproduction curves.

The illustrated marking engines 32, 34 are electrophotographic engines; however, it is to be appreciated that the color correction system 22 may be utilized with a wide variety of digital copying and printing machines and is not limited in its application to the printing machine shown herein. It is to be understood that the output devices 32, 34 may be color xerographic printers, inkjet printers, or the like.

The marking engines 32, 34 may each incorporate various xerographic subsystems generally identified as 40, 42, for forming an image, transferring the image to print media, such as a sheet of paper, and fusing the image to attach the image more permanently to the print media. In the case of a xerographic device, the marking engine typically includes a charge retentive surface, such as a rotating photoreceptor in the form of a belt or drum. The images are created on a surface of the photoreceptor. Disposed at various points around the circumference of the photoreceptor are the xerographic subsystems, which include a charging station, such as a charging corotron, for each of the colors to be applied (three are illustrated for C, M, and Y, respectively), an exposure station associated with each charging station, which forms a latent image on the photoreceptor, such as a Raster Output Scanner (ROS) or LED bar, a developer unit associated with each charging station for developing the latent image formed on the surface of the photoreceptor by applying a colorant, such as a toner to obtain a toner image, a transfer unit, such as a transfer corotron, which transfers the toner image thus formed to the surface of a print media substrate. A fuser (not shown) fuses the image to the sheet. The xerographic subsystems may be controlled by a marking engine controller 90 such as a CPU, which includes actuators for controlling each of the subsystems. The marking engine controller 90 is linked to the image processing system 28 and to the color correction system 22 and may be also linked to other known components, such as a memory, a marking cartridge platform, a marking driver, a function switch, a self-diagnostic unit, all of which can be interconnected by a data/control bus. In the illustrated embodiment, each of the marking engines 32, 34 has its own color correction system 22 including TRCs (CITRCs and/or VTRCs) for the respective marking engine, although it is also to be appreciated that a single color correction system may determine spatially corrected modified input values for multiple marking engines and may, be associated with the common image processing system 28.

The marking engines 32, 34 operate on the binary data 30 from the image processing system 28. Specifically $C_{in}$, $Y_{in}$, and $M_{in}$ values 30 are input to the appropriate TRCs 16, 92. The input values 30 are selected for achieving desired target values 94 to be output in the form of an image, but without consideration of colorant interactions which may occur. The $C_{mod}$, $Y_{mod}$, and $M_{mod}$ values 96 output from the TRCs are used in determining appropriate colorant levels for the pixel to be applied by the image applying subcomponents 40, 42 to take the colorant interactions into account. The image applying subcomponents may then generate a color document in a single pass. For example, the uniformly charged photoreceptor is initially exposed to a light image which represents a first color image separation, such as cyan, at the ROS. The resulting electrostatic latent image is then developed with cyan toner particles to produce a cyan toner image. This same image area with its cyan toner layer is then recharged, exposed to a light image which represents a second color separation such as magenta at the light image developed to produce a second color toner layer. This recharge, expose, and develop process is repeated for the yellow color separation.

The CITRCs 16 can be determined by conventional methods. For example, the $C_{mod}$ values corresponding to a set of $C_{in}$ values, at selected $M_{in}$ and $Y_{in}$ values can be determined by printing calibration patches on print media with the marking engine using different input values and measuring the corresponding output values with a suitable sensor, such as a colorimeter, spectrophotometer and the like, as described, for example, in copending application Ser. No. 11/143,818, filed Jun. 2, 2005, incorporated by reference. Periodic updates to the CITRCs can be made, either by further measurement, or by adjusting the CITRCs in accordance with predictions. For example, each of the CITRCs 16 may be stored as one or more basis vectors and an appropriate weighting which can be modified to accommodate actual or predicted changes.

Figure 4:
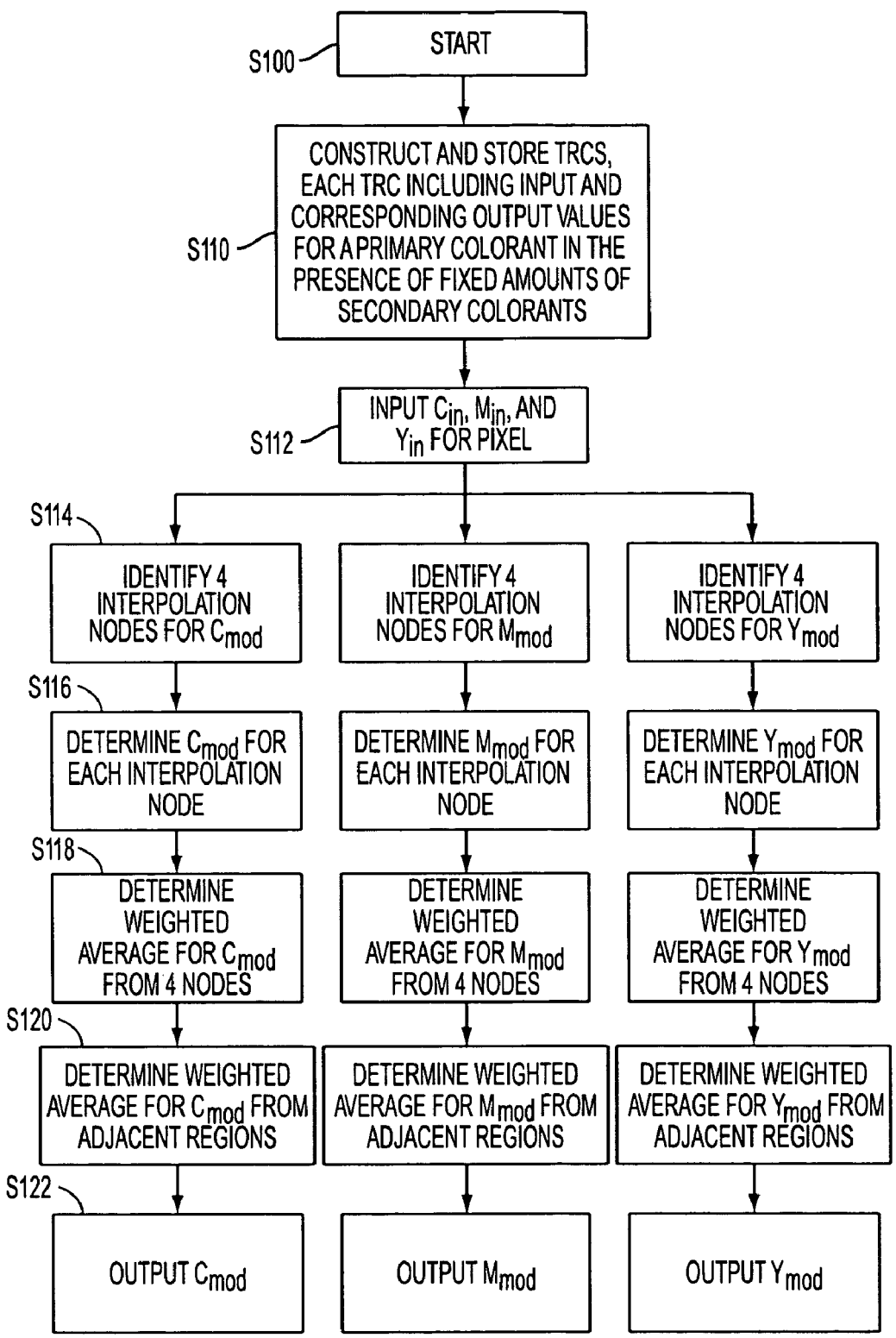
FIG. 4 illustrates exemplary steps of a method for determining colorant input values according to the first aspect of the exemplary embodiment.

FIG. 4 illustrates an exemplary method for employing spatially varying color-indexed TRCs for determining modified input values, such as desired amounts of primary color separations when used in the presence of other color separations. It will be appreciated that the order of the steps may vary from that shown and that fewer or additional steps may be employed. The method begins at step S100. At step S110, sets of spatially varying CITRCs 16 are constructed and stored for each of the color separations to be used in the printing system, for example, by inputting them into a memory 92 associated with the color correction system 22. At step S112, the image processing system 28 is input with selected C, M, and Y input values $C_{in}$, $M_{in}$, and $Y_{in}$ for a pixel of interest in a given region 14 of an image 10. The method includes determining the modified input value ($C_{mod}$) for cyan in the presence of magenta and yellow secondary colorants for the pixel 12. Similar determinations are made for $M_{mod}$ and $Y_{mod}$. By way of example, the determination of $C_{mod}$ is described.

At step S114, up to four $C_{in}$-$C_{mod}$ CITRCs which bound the desired secondary color separation $M_{in}$ and $Y_{in}$ values are identified. These CITRCs will be referred to as interpolation nodes. In the case of three color separations, there are two secondary color separations to be considered and thus up to four interpolation nodes. For example, in the embodiment illustrated in Table 1, where the selected magenta input value ($M_{in}$) is 150 and the selected yellow input value ($Y_{in}$) is 170, the CITRCs identified as 5, 6, 9, and 10 are selected as the interpolation nodes since they comprise the closest fixed M and Y input values that are above and below the desired M and Y input values. For each of these interpolation nodes, the corresponding cyan modified input value ($C_{mod}$) for a selected cyan input value ($C_{in}$) is obtained (step S116). Where the CITRC is sparse, $C_{mod}$ can be obtained by linear interpolation, generating a weighted average of the $C_{mod}$ values for the two $C_{in}$ values bounding the selected $C_{in}$ value. In such an interpolation method, the weight applied to each of the two $C_{mod}$ values to be interpolated is inversely proportional to the distance of the selected $C_{in}$ value from the two bounding $C_{in}$ values on the CITRC. Other methods for determining $C_{in}$ from an interpolation node CITRC, such as by curve fitting, are also contemplated. It will be appreciated that where there is a stored CITRC corresponding exactly to the desired $M_{in}$ and/or $Y_{in}$ value, fewer than four interpolation nodes can be used.

At step S118, the four $C_{mod}$ values obtained from the four interpolation nodes are interpolated to generate a single combined $C_{mod}$ value. The interpolation can be a bilinear interpolation with the weights applied to each $C_{mod}$ value being inversely proportional to the distances of the $M_{in}$ and $Y_{in}$ values from the fixed $M_{in}$ and $C_{in}$ values used in generating the interpolation node CITRC. The weights may be normalized such that they add up to 1.

At step S120, where there is more than one region in the image, an interpolation is performed using the $C_{mod}$ value obtained in step S118 for the region 14 in which the pixel 12 of interest is located and the $C_{mod}$ values similarly obtained for adjacent regions by applying appropriate weightings to each of the $C_{mod}$ values. The weights may be normalized such that they add up to 1. It will be appreciated that steps S118 and S120 can be combined using an appropriate function with weights for each of the CITRCs in the region and adjacent regions.

The output of step S120 is a single $C_{mod}$ value which can be used by the image rendering device as the actual input value to be used for the pixel of interest in the image for achieving a target value $C_{out}$ (Step 122). Or the value of $C_{mod}$ can be further manipulated, if appropriate. It is to be understood that in many common imaging devices the raster input values are halftoned prior to actually driving the imaging device.

$M_{mod}$ and $Y_{mod}$ input values for the pixel of interest are determined in a similar way using comparable sets of CITRCs for M and Y, respectively (steps S114-122). The method can be repeated for each pixel in the image.

Vectorized TRC

Figure 5:
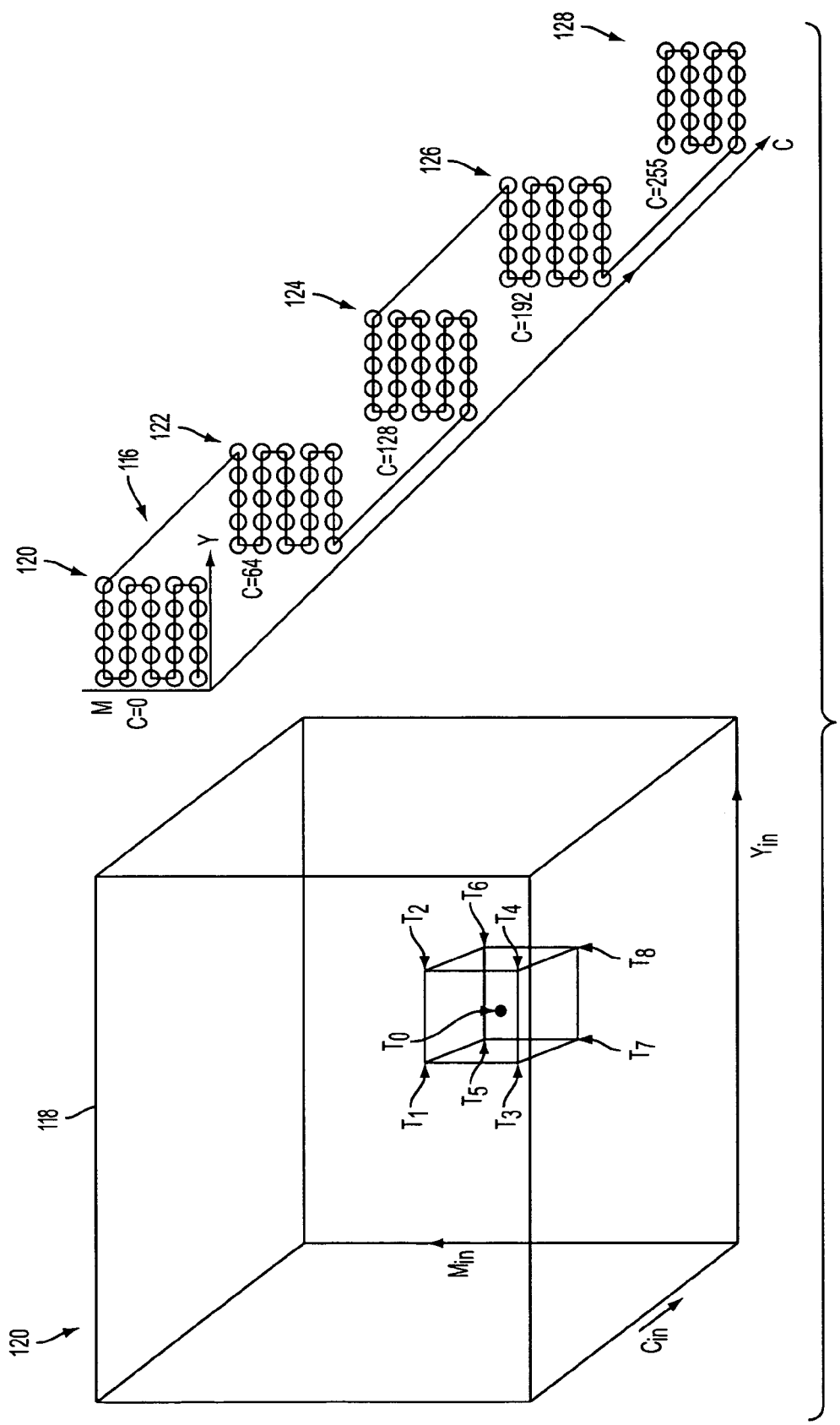
FIG. 5 illustrates schematically a three-dimensional look-up table and how a vectorized tone reproduction curve is generated with serpentine indexing according to a second aspect of the exemplary embodiment.
Figure 6:
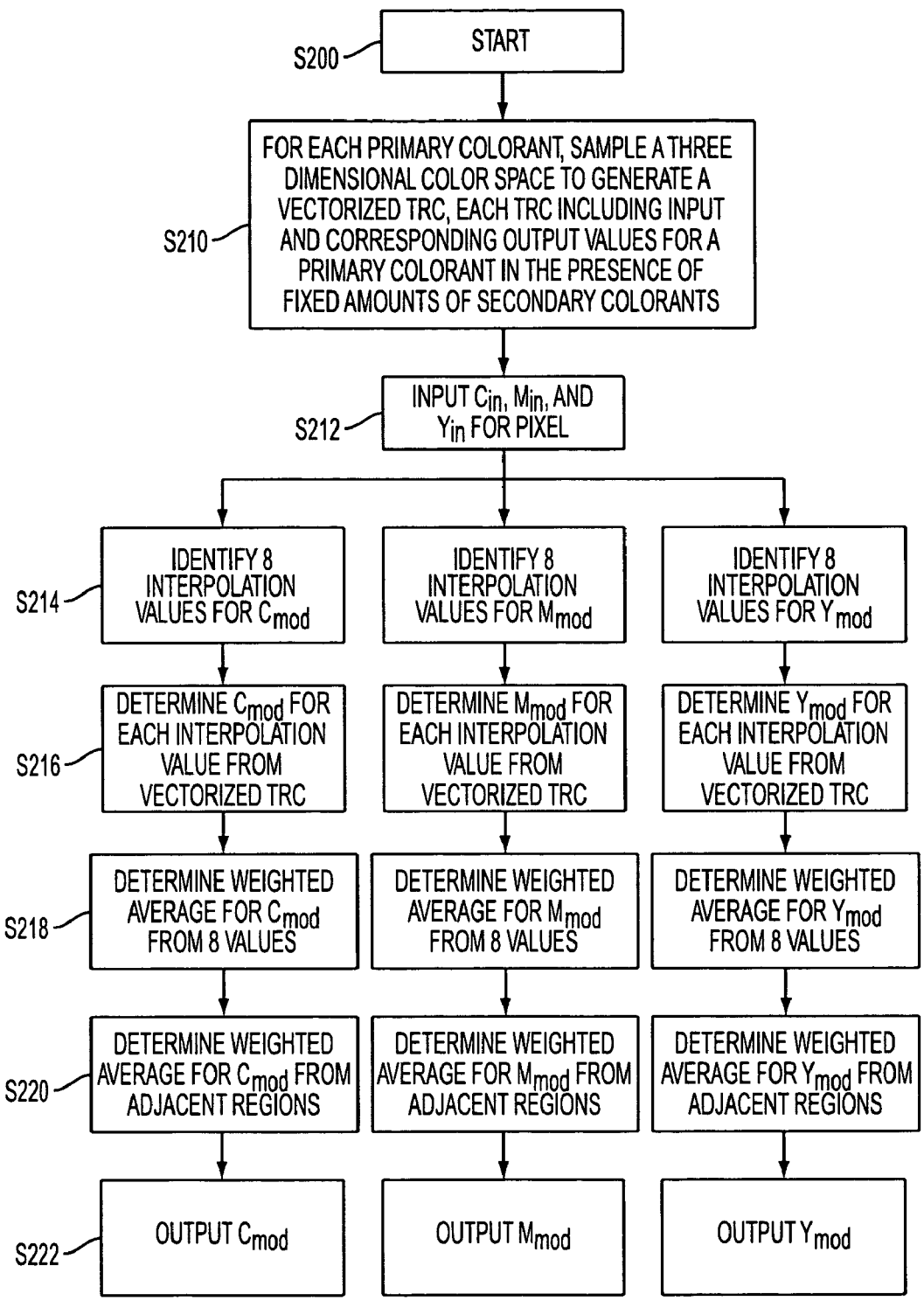
FIG. 6 illustrates exemplary steps of a method for determining colorant input values according to the second aspect of the exemplary embodiment.

With reference now to FIGS. 5 and 6, in another aspect of the exemplary embodiment, rather than selecting CITRCs which provide four interpolation nodes, a vectorized TRC (VTRC) 116 is generated for each of the color separations. As with the interpolation nodes described in the earlier embodiment, each VTRC 116 is a one-dimensional TRC which takes into account the influence of the other color separations on the color separation input values to be used in achieving a desired color separation output.

The VTRCs will be described in terms of three color separations and their corresponding colorants, C, M, and Y, although it will be appreciated that the same principles can be applied to two colorants or four (or more) colorants. In this embodiment, a multidimensional, e.g., three-dimensional color space 118 can be described in terms of C, M, and Y dimensions (FIG. 5). The color space can be in the form of planes of a multi-dimensional color mapping. Each of the points in the color space corresponds to a combination of input C, M, Y values. At each such point, the corresponding modified input C, M, Y values are obtained that achieve the desired target color value. Some of the modified input values can be determined experimentally, for example, by printing test patches, as described above. Other points can be determined through interpolation (using a space-filling curve). The steps of the method, illustrated in FIG. 6, can proceed in a similar manner to that of FIG. 4, except as otherwise noted.

In one embodiment, the three-dimensional color space 118 is sampled using a serpentine raster to sample successive planes 120, 122, 124, 126, 128 of the color space (FIG. 5). For example, for a given $(C_{in}, M_{in}, Y_{in}) \rightarrow C_{mod}$, successive $C_{in}$ planes are serpentine rastered. Starting at, for example, the $C_0$ plane 120 corresponding to $C_{in}=0$, the raster starts with $M_{in}$, $Y_{in}$ of, for example $M_{in}=0$, $Y_{in}=0$, and for that $M_{in}$, $Y_{in}$ is incrementally increased to obtain values of $C_{mod}$. For example, in 8-bit notation, the values of $C_{mod}$ for $(C_0, M_0, Y_0)$, $(C_0, M_0, Y_{31})$, $(C_0, M_0, Y_{63})$, $(C_0, M_0, Y_{95})$ ... $(C_0, M_0, Y_{255})$ may be sampled. Once the highest value of $Y_{in}$ is reached (e.g. $Y_{255}$), the value of $M_{in}$ is incremented (e.g., to $M_{31}$) and at the new $M_{in}$ value, $Y_{in}$ is incrementally decreased to obtain values of $C_{mod}$. Once the minimum value of $Y_{in}$ is reached, $M_{in}$ is incremented again and at the new $M_{in}$, $Y_{in}$ is incrementally increased to obtain values of $C_{mod}$ for each increment of $Y_{in}$. This process is repeated in back and forth fashion, with increasing values of $M_{in}$ until the highest value of $M_{in}$ (e.g., $M_{255}$) is reached and the starting $C_0$ plane has been sampled. The raster scan continues to the next C plane, e.g., the $C_{31}$ plane 122, and the process repeated, this time, with incremental decreases of $M_{in}$ as illustrated. The sampling is repeated for each of the C planes.

Figure 7:
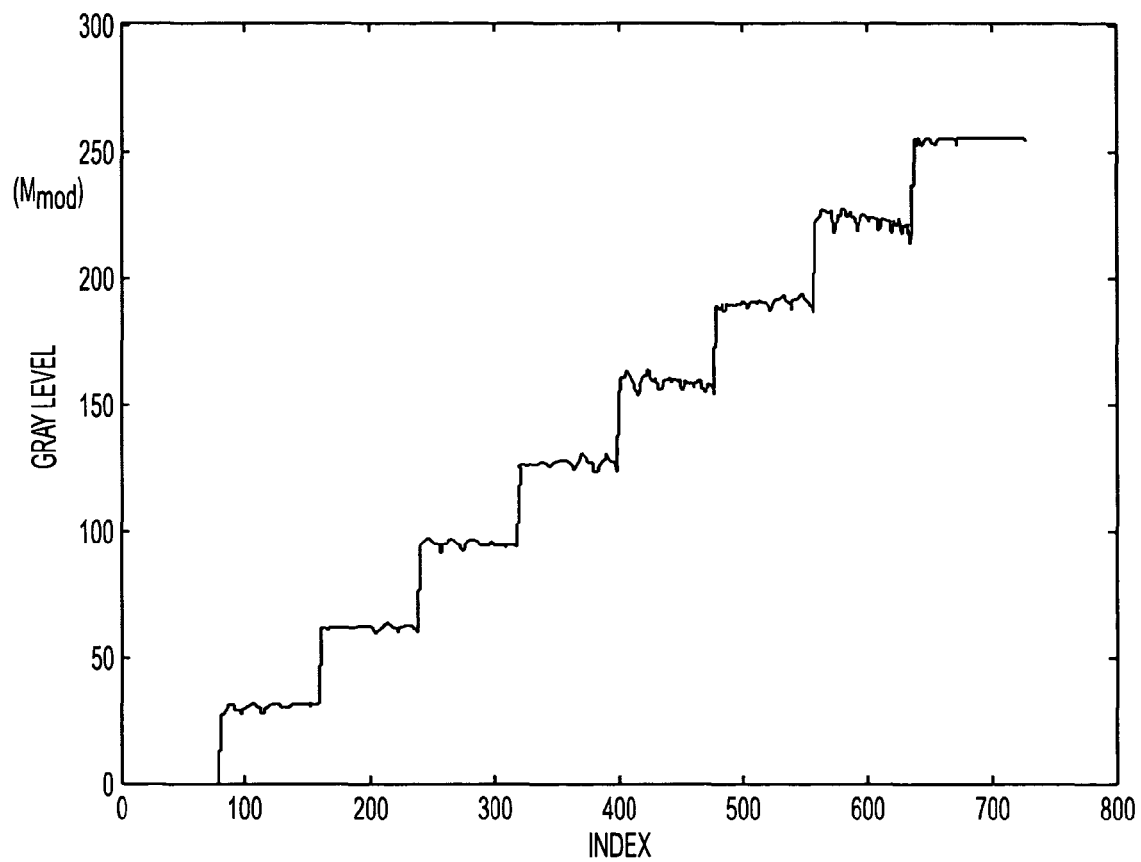
FIG. 7 is an exemplary plot of a vectorized TRC.

In the illustrated example of FIG. 5, a 5×5×5 raster includes 625 modified input values corresponding to input values for the color separation, although a less sparse vector may be a 9×9×9 raster which includes 729 modified input values corresponding to input values for the color separation. It is to be appreciated that the raster could in general be smaller or larger, e.g, expressed as a $P^1 \times P^2 \times P^3$ raster, where $P^1$, $P^2$, $P^3$ can be from about 3 to about 20. The raster assigns each modified input value an index point generally corresponding to the order in which the 3-dimensional TRC was raster sampled. While rastering may proceed in other than a serpentine fashion, the serpentine rastering generally provides a smooth vectorized curve (FIG. 7) which can be expressed in terms of relatively few basis vectors. The sampled values can then be stored in a one-dimensional VTRC which includes modified input values for that color separation (Step S210) and corresponding index point on the raster (illustrated as index points from 0-729 in FIG. 7). In order to sample the VTRC, the index point corresponding to the desired input value at fixed input values of the secondary color separations is first determined. This information may be stored in a look-up table which matches the points on the raster to their original locations in the three-dimensional TRC.

At step S212, target input values for C, M and Y are input to the processor 22. As for the method of FIG. 4, the input values for the three color separations are separately determined for a pixel 12 of interest. By way of example, the input value for the cyan color separation, $C_{in}$ will be described.

If the given color separation input values of the pixel of interest for cyan, magenta, and yellow fall exactly on one of the index points of the vectorized TRC, then the vectorized TRC can be accessed directly. Where one or more of the values does not correspond, then an interpolation is made by selecting index points on the vector corresponding to $C_{in}$ values for which the $M_{in}$, and $Y_{in}$ values are close to the given $M_{in}$ and $Y_{in}$ values of the pixel, and in one embodiment are the index points for which the $M_{in}$ and $Y_{in}$ values are the closest of those for which a raster sample has been made. The identification of these points may proceed as follows. First, the index points for the $C_{mod}$ values corresponding to the closest rasterized $C_{in}$ values are identified (step S214). It will be appreciated from FIG. 5 that any target value of $C_{in}$, e.g., $T_0$, located within the three-dimensional color space 118 falls within a block bounded by eight corners $T_1$, $T_2$, $T_3$, $T_4$, $T_5$, $T_6$, $T_7$, $T_8$ corresponding to the bounding values of the secondary color separations ($Y_{in}$ and $M_{in}$ in this case). The coordinates of these eight most closely adjacent locations (interpolation points) for which $C_{mod}$ values have been established can be determined (for target $C_{in}$ values which fall on the edges of the color space, or on one of the planes, there may be fewer than eight interpolation points) and their corresponding index points within the vectorized TRC identified.

The vectorized TRC 116 is then accessed and the $C_{mod}$ values for each of the eight interpolation points are obtained (step S216). A weighted average is obtained for the eight interpolation values of $C_{mod}$ (step S218). The weightings applied may be inversely proportional to the distance of the target point $T_0$ from the respective interpolation point $T_1$, $T_2$, $T_3$, $T_4$, $T_5$, $T_6$, $T_7$, or $T_8$. The weightings may be normalized such that the total weights add up to 1.

It will be appreciated that the coordinates of the interpolation points corresponding to any given location in the three-dimensional space 118 and the corresponding index points on the raster can be determined and stored so that the three-dimensional space itself does not need to be stored in the processor 22. Thus, for example, a look-up table may include, for all possible $C_{in}$, $M_{in}$, $Y_{in}$ values, the eight index points on the raster to be selected (which correspond to the eight interpolation points) and the weightings to be applied in interpolating the corresponding values of $C_{mod}$.

At step S220, where there is more than one region 14 in the image, an interpolation is performed using the $C_{mod}$ value obtained in step S218 for the region 14 in which the pixel 12 is located and the $C_{mod}$ values similarly obtained for adjacent regions by applying appropriate weightings to each of the $C_{mod}$ values, as described for step S120 above. The output of step S220 is a single $C_{mod}$ value which can used by the image rendering device as the actual input value for cyan to be used for the particular pixel of the image for achieving the target $C_{in}$ value (Step 222) or further manipulated, if appropriate.

In one aspect, the color-indexed TRCs or vectorized TRCs are expressed in the form of basis vectors which are combinable to represent the respective TRC. The methods for selection and combination of basis vectors to represent a TRC are described, for example, in above-mentioned U.S. application Ser. No. 10/922,316 incorporated herein by reference. In one method, colorant interferences are addressed by generating a collection of CITRCs or VTRCs as described above and selecting, from a larger set of basis vectors, a subset of basis vectors that represent the CITRCs or VTRCs (e.g., when combined with appropriate weightings). Colorant compensating CITRCs or VTRCs that are derived from the subset of basis vectors are then applied to a digital image to compensate for colorant interferences occurring when the image is rendered by the imaging device.

Where spatial corrections are also to be performed, a method of employing spatial and colorant compensating TRCs for addressing colorant interferences which vary across a space of desired uniformity may therefore include generating a collection of CITRCs or VTRCs over the space of desired uniformity, selecting a subset of basis vectors that represent the CITRCs or VTRCs, and then applying to a digital image, uniformity compensating CITRCs or VTRCs that are derived from the subset of basis vectors. The space of desired uniformity may be as described above.

The CITRCs or VTRCs may be derived from a subset of orthogonal basis vectors. Weights may be associated with the basis vectors. For example, the colorant compensating CITRCs or VTRCs may be applied to the digital image as arithmetic operations forming a linear combination of basis vectors.

In one aspect, the orthogonal basis vectors may be data-dependent basis vectors, e.g., Singular Value Decomposition (SVD) basis vectors or Principal Component Analysis (PCA) basis vectors. Alternatively they may be data-independent basis vectors, such as the Discrete Cosine Transform (DCT) basis vectors. The colorant compensating CITRCs or VTRCs may be applied to the digital image as look-up tables (LUTs), where the LUTs are generated by a linear combination of the subset of basis vectors. Another LUT may be used to identify an appropriate set of CITRCs or VTRCs for a given pixel position in the digital image. The pixel position LUT may use the pixel column and or row of the given pixel in the digital image as the index to the LUT. A pixel position weight LUT may be used to select basis vector weights for the given pixel within the digital image.

When two or more marking engines are desired to be consistent in their overall system tone reproductions, such as in a printing system as described above where pages of a job are distributed among similar marking engines, the CITRCs or VTRCs may be coordinated such that the $C_{mod}$, $Y_{mod}$, and $M_{mod}$ values for one marking engine do not exceed the maximum values utilizable by any of the marking engines in the printing system.

Optionally, the colorant correction system 22 includes a spatially dependent decorrelating function that compensates for detected or isolated colorant interaction based aspects of the measured spatial uniformity variations, and a colorant interaction based spatial uniformity variation compensator that is operative to receive the spatially dependent decorrelating function from the colorant interaction based spatial uniformity detector/isolator, to receive a first color and location description and to processes the first color description through the decorrelating function, in accord with the location information, thereby generating a colorant description that is compensated for spatially dependent colorant interaction effects of the at least one image rendering device. Such a decorrelating function is described, for example, in U.S. application Ser. No. 11/143,818, filed Jun. 2, 2005, by Edul N. Dalal, entitled INTER-SEPARATION DECORRELATOR, which is incorporated herein by reference in its entirety.

Without intending to limit the scope of the exemplary embodiment, the following examples demonstrate the effectiveness of the techniques described herein.

EXAMPLES

Example 1

Color-Indexed TRCs

Spatial color compensation was performed using a plurality of color-indexed TRCs and compared with the values generated by three-dimensional look-up tables. Sixteen color-indexed TRCs were generated for each of the primary colorants C, M, and Y at fixed levels of the secondary colorants using data from a three-dimensional look-up table (a 9×9×9 look-up table) in which each point in the look-up table represents fixed values of C, M and Y. The process was repeated for eight additional three-dimensional look-up tables, each corresponding to a different cross process location on a marking engine. Each CITRC generated consisted of nine input values corresponding to nine modified input values for the color separation in the presence of fixed values of the secondary color separations. As an example, TRCs for the 0 position (first position) are given in FIG. 2. Although there are deviations from the three-dimensional look-up table when the color-indexed TRCs were applied to target CMY colorant input values to obtain modified color input values, the deviations can be minimized by optimizing the selection of the indexing points of the CITRCs and by increasing the number of stored values in each of the TRCs. An advantage of the color-indexed TRCs over a three-dimensional look-up table is that there can be a significant memory saving. In this example, the 9×9×9 look-up table would take 9×9×9×3=2187 bytes of memory, while the 48 CITRCS only take 48×9=432 bytes of memory. In summary, that is a reduction of more than 80% in the amount of memory needed.

Example 2

Vectorized TRC

The nine three-dimensional look-up tables corresponding to nine cross process locations of a marking device used for Example 1 were vectorized to produce 9×3 vectorized TRCs, with each three-dimensional look-up table represented by 3 vectorized TRCs. SVD analysis was performed as described in above-referenced Ser. No. 10/922,316, incorporated herein by reference.

Briefly, SVD analysis was performed to create a basis vector representation of the VTRCs. This representation has been shown to be advantageous in several ways. Eliminating higher basis functions tends to suppress random marking and measurement noise. Additionally, the basis representation provides a form of data compression and thus allows for efficient storage of the VTRCs.

The results showed that a VTRC can produce output colors as accurately as conventional multidimensional look-up table methods. Further, basis vectors methods can be easily applied to the VTRCs to yield noise suppression and efficient storage.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A color transformation system comprising:
   memory which stores, for each of a plurality of color separations in a digital image, a plurality of one-dimensional tone reproduction curves, each of the tone reproduction curves for a respective color separation accounting for non-linear colorant interactions between a primary colorant with which the respective color separation is to be rendered, and at least one secondary colorant with which at least a second of the plurality of color separations is to be rendered, each of the tone reproduction curves for the respective color separation including modified input values corresponding to input values for the respective color separation at a respective single fixed input value of the at least the second color separation, including a first one-dimensional tone reproduction curve for the respective color separation at a first fixed input value of the at least the second color separation and at least a second one-dimensional tone reproduction curve for the respective color separation at a second fixed input value of the at least the second color separation, different in amount from the first fixed input value;
   a processing component, which, for each pixel of the digital image having a given input value for the respective color separation and a given input value for at least the second color separation:
      accesses the memory and selects, from the plurality of stored one-dimensional tone reproduction curves for the respective color separation, at least one tone reproduction curve for which the fixed input value for the second color separation is close to the given input value for the second color separation for the pixel;
      for each of the selected tone reproduction curves, determines a modified input value for the respective color separation which corresponds to the input value for that color separation; and
      where more than one tone reproduction curve is selected, determines a combined modified input value for the respective color separation of the pixel as a function of the modified input values for the respective separation determined from the selected tone reproduction curves; and
      outputs the modified input value for the pixel of the digital image, whereby for each pixel of the image having a given input value for the respective color separation and a given input value for at least the second color separation, each selected at least one tone reproduction curve is one for which the fixed input value for the second color separation is close to the given input value for the second color separation.

2. The system of claim 1, wherein the processing component performs the color transformation for each of a plurality of color separations in a digital image including selecting at least one tone reproduction curve from a respective set of tone reproduction curves for each of the plurality of color separations.

3. The system of claim 1, wherein a set of tone reproduction curves is stored for each of a plurality of regions of the image, one of the regions comprising the pixel, and wherein the selected tone reproduction curves are identified for at least the region comprising the pixel.

4. The system of claim 3, wherein the selected tone reproduction curves are also identified for at least one region adjacent to the region comprising the pixel, the method further comprising determining the modified input value for the color separation of the pixel as a function of the color separation modified input values determined from the selected tone reproduction curves for the region and for the at least one adjacent region.

5. The system of claim 4, wherein the selected tone reproduction curves are identified for a plurality of regions adjacent to the region comprising the pixel.

6. The system of claim 5, wherein the determination of the first color separation's combined modified input value for the pixel as a function of the first color separation's modified input values determined from the selected tone reproduction curves for the region and for the at least one adjacent region includes:
applying a weighting to the first color separation's modified input values determined from the selected tone reproduction curves for the region and for the at least one adjacent region which is a function of a location of the pixel; and
determining an average of the weighted color separation's modified input values determined from the selected tone reproduction curves.

7. The system of claim 3, wherein the plurality of regions comprises at least four regions.

8. The system of claim 3, wherein the plurality of regions includes regions which are uniformly spaced in at least one of a process direction and a cross-process direction.

9. The system of claim 1, wherein there are three color separations.

10. The system of claim 9, wherein the identifying of the plurality of selected tone reproduction curves includes identifying four tone reproduction curves corresponding to two fixed input values of each of second and third color separations.

11. The system of claim 1, wherein the processing component determines the combined modified input value for the first color separation of the pixel including determining a weighted average of the modified input values for the first color separation determined from the selected tone reproduction curves.

12. The system of claim 1, wherein the determining of the combined modified input value for the first color separation of the pixel as a function of the modified input values for the first color separation determined from the selected tone reproduction curves comprises determining a combined modified input value for the first color separation of the pixel as a function of the location of the pixel in the digital image.

13. The system of claim 1, wherein the establishing of the plurality of tone reproduction curves includes establishing a set of tone reproduction curves for each of a plurality of regions in an image, the identification of selected tone reproduction curves including identifying selected tone reproduction curves from the set of tone reproduction curves for the region of the plurality of regions in which the pixel is located.

14. The system of claim 1, wherein the tone reproduction curves are each represented by a plurality of basis vectors.

15. The system of claim 1 wherein the fixed input values of the at least one second color separation of the selected tone reproduction curves bound the given input values of the second color separation for the pixel of interest.

16. An image rendering device comprising:
a plurality of colorants for rendering an image; and
a color transformation system according to claim 1.

17. A xerographic system comprising the image rendering device of claim 16.

18. A color transformation method, comprising:
for each of a plurality of color separations of a digital image
a) for each of a plurality of regions of the image, storing a plurality of one-dimensional tone reproduction curves in memory of a color correction system, each of the tone reproduction curves accounting for non-linear colorant interactions between a respective colorant with which the color separation is to be rendered and at least one secondary colorant with which a second of the plurality of color separations is to be rendered, each of the one dimensional tone reproduction curves including modified input values corresponding to input values for the respective color separation at fixed input values of the at least one other color separation;
b) for a pixel of interest in the image which is located in a first of the regions, the pixel having a given input value for the respective color separation and a given input value for the at least second color separation, with a processing component of the color correction system, accessing the memory and identifying, from the plurality of tone reproduction curves for the first region, a plurality of bounding tone reproduction curves for which the fixed input values for the at least one other color separation bound the given input value of the at least second color separation;
c) from each of the bounding tone reproduction curves, determining the modified input value which corresponds to the input value for the respective color separation;
d) determining the combined modified input value for the respective color separation of the pixel of interest as a function of the modified input values determined from the bounding tone reproduction curves and outputting the combined modified input value for the respective color separation of the pixel of interest, thereby effecting the color transformation.

19. The method of claim 18, where there are input values for at least two other color separations and the method includes identifying four bounding tone reproduction curves.

20. The method of claim 18, further comprising:
e) for a second pixel of interest in the image which is located in a second of the regions, the second pixel having an input value for the respective color separation and an input value for the at least a second color separation, identifying, from the plurality of tone reproduction curves for the second region, a plurality of bounding tone reproduction curves for which the fixed input values for the at least second color separation bound the input value of the at least second color separation;
f) from each of the bounding tone reproduction curves, determining a modified input value which corresponds to the input value for the respective color separation; and g) determining a combined modified input value for the respective color separation for the second pixel as a function of the modified input values for the respective color separation determined from the bounding tone reproduction curves.

21. The method of claim 18, wherein the determining of the combined modified input value for the respective color separation of the pixel of interest is determined as a function of the modified input values determined from the bounding tone reproduction curves of the first region and at least one region adjacent to the first region.

22. A color transformation method comprising:

for a plurality of color separations in a digital image, establishing a plurality of tone reproduction curves and storing them in memory of a color correction system, each of the tone reproduction curves accounting for colorant interactions between a respective primary colorant, selected from cyan, magenta and yellow colorants, with which that respective color separation is to be rendered and at least one secondary colorant, the second colorant being a different one of cyan, magenta, and yellow colorants than the primary colorant, with which at least one other of the plurality of color separations is to be rendered, each of the tone reproduction curves including modified input values and corresponding input values for the respective color separation at a respective fixed input value of at least the one other color separation, whereby tone reproduction curves corresponding to a plurality of different fixed input values of the at least the one other color separation are provided;

with a processing component of the color correction system, for each pixel of a plurality of pixels of the digital image having a given input value for a respective one of the color separations and a given input value for at least one other color separation, accessing the memory and selecting, from the plurality of tone reproduction curves for that color separation, at least one tone reproduction curve for which the fixed input value for at least one other color separation is close to the given input value of that pixel for the one other color separation;

with the processing component of the color correction system, for each of the selected tone reproduction curves, determining a modified input value for the respective color separation which corresponds to the input value for the respective color separation; and where more than one tone reproduction curve is selected, determining a combined modified input value for the respective color separation of the pixel as a function of the modified input values for the respective color separation determined from the selected reproduction curves.

23. The color transformation method of claim 22, wherein the plurality of color separations comprises three color separations and for each color separation the tone reproduction curves comprise sixteen tone reproduction curves providing four different fixed input values for each of second and third of the color separations.

24. The color transformation method of claim 22, wherein the fixed input values of each of the other color separations include four fixed values for each of the other color separations.

25. The color transformation method of claim 24, wherein the fixed input values of each of the other color separations include minimum and maximum values of the other color separation and two intermediate values.

26. The method of claim 18, further comprising forming an image with the first and second colorants.

27. The method of claim 22, further comprising forming an image with the cyan, magenta, and yellow colorants.

* * * * *